(12) United States Patent
He et al.

(10) Patent No.: US 9,277,471 B2
(45) Date of Patent: Mar. 1, 2016

(54) CHANNEL STATE INFORMATION FEEDBACK SCHEME FOR COOPERATIVE MULTI POINT TRANSMISSION AND CARRIER AGGREGATION SCENARIO

(71) Applicant: Intel Corporation, Santa Clara, CA (US)

(72) Inventors: Hong He, Beijing (CN); Alexei Vladimirovich Davydov, Nizhny Novgorod (RU); Youn Hyoung Heo, Seoul (KR); Jong-Kae Fwu, Sunnyvale, CA (US); Kamran Etemad, Potomac, MD (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,654

(22) PCT Filed: Oct. 25, 2013

(86) PCT No.: PCT/US2013/066786
§ 371 (c)(1),
(2) Date: Dec. 16, 2013

(87) PCT Pub. No.: WO2014/070602
PCT Pub. Date: May 8, 2014

(65) Prior Publication Data
US 2014/0269383 A1    Sep. 18, 2014

Related U.S. Application Data

(60) Provisional application No. 61/721,436, filed on Nov. 1, 2012.

(51) Int. Cl.
*H04W 36/20*   (2009.01)
*H04W 28/24*   (2009.01)
(Continued)

(52) U.S. Cl.
CPC ............ *H04W 36/20* (2013.01); *H04B 7/0417* (2013.01); *H04B 7/0452* (2013.01);
(Continued)

(58) Field of Classification Search
None
See application file for complete search history.

(56) References Cited

U.S. PATENT DOCUMENTS 8,681,627 B2 *   3/2014   Choudhury et al. .......... 370/235
2001/0051994 A1  12/2001  Serizawa et al.
(Continued)

FOREIGN PATENT DOCUMENTS

| EP | 2369883 A1 | 9/2011 |
|----|------------|--------|
| KR | 102012003328 A | 4/2012 |

(Continued)

OTHER PUBLICATIONS

"Evolved Universal Terrestrial Radio Access (E-UTRA); Physical layer procedures", 3GPP TS 36.213 V11.0.0 (Sep. 2012) Technical Specification Group Radio Access Network; (Release 11), Sep. 2012), 143 pgs (p. 59 is pertinent).*

(Continued)

*Primary Examiner* — Ian N Moore
*Assistant Examiner* — Justin T Van Roie
(74) *Attorney, Agent, or Firm* — Schwegman Lundberg & Woessner, P.A.

(57) ABSTRACT

Embodiments of a system and method for reporting uplink control information (UCI) are generally described herein. In some embodiments, a first and second component carrier (CC) is provided for a user equipment (UE). The first and second CC are configured with transmission mode (TM) 10 and TMs 1-9, respectively. A first channel state information (CSI) report for the first CC with TM 10 and a second CSI report for the second CC with at least one of TMs 1-9 are scheduled for transmission in a subframe. A collision is detected between the first and second CSI reports. Priority is assigned to the first CSI report or the second CSI report based on a prioritization parameter. The prioritized CSI report is transmitted based the prioritization parameter.

21 Claims, 8 Drawing Sheets

(51) Int. Cl.

| | | |
|---|---|---|
| *H04W 52/02* | (2009.01) | |
| *H04W 24/08* | (2009.01) | |
| *H04J 3/06* | (2006.01) | |
| *H04L 5/00* | (2006.01) | |
| *H04W 16/24* | (2009.01) | |
| *H04W 8/00* | (2009.01) | |
| *H04W 72/04* | (2009.01) | |
| *H04W 76/02* | (2009.01) | |
| *H04B 7/04* | (2006.01) | |
| *H04B 7/06* | (2006.01) | |
| *H04W 28/02* | (2009.01) | |
| *H04W 4/00* | (2009.01) | |
| *H04W 76/04* | (2009.01) | |
| *H04L 29/12* | (2006.01) | |
| *H04W 16/20* | (2009.01) | |
| *H04W 16/26* | (2009.01) | |
| *H04W 60/04* | (2009.01) | |
| *H04W 64/00* | (2009.01) | |
| *H04W 36/14* | (2009.01) | |

(52) U.S. Cl.
CPC ........... *H04B 7/0626* (2013.01); *H04J 3/0614* (2013.01); *H04L 5/0046* (2013.01); *H04L 5/0048* (2013.01); *H04L 61/3005* (2013.01); *H04L 61/3075* (2013.01); *H04W 4/005* (2013.01); *H04W 8/005* (2013.01); *H04W 16/20* (2013.01); *H04W 16/24* (2013.01); *H04W 16/26* (2013.01); *H04W 24/08* (2013.01); *H04W 28/0268* (2013.01); *H04W 28/24* (2013.01); *H04W 36/14* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 76/023* (2013.01); *H04W 76/046* (2013.01); *Y02B 60/50* (2013.01)

(56) References Cited

U.S. PATENT DOCUMENTS

| | | | |
|---|---|---|---|
| 2008/0188247 A1 | 8/2008 | Worrall | |
| 2011/0038326 A1 | 2/2011 | Davies et al. | |
| 2011/0059744 A1 | 3/2011 | Won et al. | |
| 2011/0110347 A1 | 5/2011 | Mun | |
| 2011/0149728 A1 | 6/2011 | Lee | |
| 2011/0190000 A1 | 8/2011 | Kwun | |
| 2011/0310769 A1 | 12/2011 | Lee et al. | |
| 2011/0319065 A1 | 12/2011 | Dalsgaard et al. | |
| 2012/0039252 A1* | 2/2012 | Damnjanovic et al. | 370/328 |
| 2012/0155406 A1 | 6/2012 | Kim et al. | |
| 2012/0220286 A1 | 8/2012 | Chen et al. | |
| 2012/0252518 A1 | 10/2012 | Karampatsis et al. | |
| 2013/0080597 A1 | 3/2013 | Liao | |
| 2013/0258874 A1* | 10/2013 | Khoshnevis et al. | 370/252 |
| 2013/0303206 A1 | 11/2013 | Starsinic et al. | |
| 2014/0016614 A1 | 1/2014 | Velev et al. | |
| 2014/0086174 A1* | 3/2014 | Nam et al. | 370/329 |
| 2014/0113667 A1 | 4/2014 | Keller et al. | |
| 2014/0269779 A1 | 9/2014 | Shan et al. | |
| 2015/0215928 A1* | 7/2015 | Davydov | H04L 5/0053 370/329 |
| 2015/0237521 A1* | 8/2015 | Davydov | H04W 24/10 370/329 |

FOREIGN PATENT DOCUMENTS

| | | |
|---|---|---|
| KR | 102012009436 A | 8/2012 |
| KR | 102012009640 A | 8/2012 |
| WO | WO-2012109989 A1 | 8/2012 |
| WO | WO-2014070602 A1 | 5/2014 |
| WO | WO-2014070649 A1 | 5/2014 |
| WO | WO-2014070901 A1 | 5/2014 |
| WO | WO-2014070929 A1 | 5/2014 |

OTHER PUBLICATIONS

"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.

"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.

"Evolved Universal Terrestrial Radio Access (E-UTRA); Study on signalling and procedure for interference avoidance for in-device coexistence", 3GPP TR 36.816 V11.1.0 (Sep. 2011) Technical Specification Group Radio Access Network (Release 11), (Sep. 2011), 44 pgs.

"Inter-RAT mobility for UE under IDC interference", 3GPP TSG-RAN WG2 #79bis; R2-124725; Agenda Item 7.6.3; LG Electronics Inc., (Oct. 8, 2012), 1 pg.

"Inter-RAT operation for in-device coexistence", 3GPP TSG RAN WG2 Meeting #80; R2-125750; Agenda Item 7.6.1; Intel Corporation, (Nov. 12, 2012), 2 pgs.

"Title Change Request", 3GPP TSG-RAN WG2 Meeting #79bis; R2-125108, (Oct. 8, 2012), 5 pgs.

Hong, Wei, et al., "Considering In-Device Coexistence interference from WiFi point of view", IEEE 802.11-13/0880-00, (Jul. 17, 2013), 13 pgs.

"U.S. Appl. No. 14/124,939, Preliminary Amendment filed Dec. 9, 2013", 9 pgs.

"U.S. Appl. No. 14/126,611, Preliminary Amendment filed Dec. 16, 2013", 11 pgs.

"CSI Collision Handling for CoMP", R1-123468, 3GPP TSG RAN WG1 #70, Samsung, (Aug. 2012), 3 pgs.

"Discussion on reduction of CSI processing complexity to support CoMP", R1-124368, 3GPP TSG RAN WG1 #70bis, Samsung, (Oct. 2012), 4 pgs.

"Evaluation of MTC Device triggering", HTC, TD S2-110732, 3GPP TSG SA WG2 Meeting #83, (Feb. 2011), 2 pgs.

"International Application Serial No. PCT/US2013/066786, International Search Report mailed Feb. 14, 2014", 4 pgs.

"International Application Serial No. PCT/US2013/066786, Written Opinion mailed Feb. 12, 2014", 6 pgs.

"International Application Serial No. PCT/US2013/067043, International Search Report mailed Feb. 25, 2014", 4 pgs.

"International Application Serial No. PCT/US2013/067043, Written Opinion mailed Feb. 25, 2014", 6 pgs.

"International Application Serial No. PCT/US2013/067522, International Search Report mailed Feb. 12, 2014", 3 pgs.

"International Application Serial No. PCT/US2013/067522, Written Opinion mailed Feb. 12, 2014", 6 pgs.

"International Application Serial No. PCT/US2013/067575, International Search Report mailed Feb. 21, 2014", 3 pgs.

"International Application Serial No. PCT/US2013/067575, Written Opinion mailed Feb. 21, 2014", 6 pgs.

"Triggering a detached MTC device", InterDigital Communications, TD S2-110673, 3GPP TSG SA WG2 Meeting #83, (Feb. 2011), 4 pgs.

"3GPP MTC Standard TTA M2M Seminar", ETRI Standards Research Center, [Online] retrieved from the internet:<edu.tta.or.kr/sub3/down.php?No=123&file=M2M_1-4.pdf>, (Oct. 23, 2012).

"U.S. Appl. No. 14/126,611, Non Final Office Action mailed Oct. 23, 2014", 10 pgs.

"U.S. Appl. No. 14/126,611, Response filed Jan. 23, 2015 to Non Final Office Action mailed Oct. 23, 2014", 12 pgs.

"The Mobile Broadband Standard", 3GPP List of Work Items, [Online] retrieved from the internet:<http://www.3gpp.org/DynaReport/WI-List.html>.

\* cited by examiner

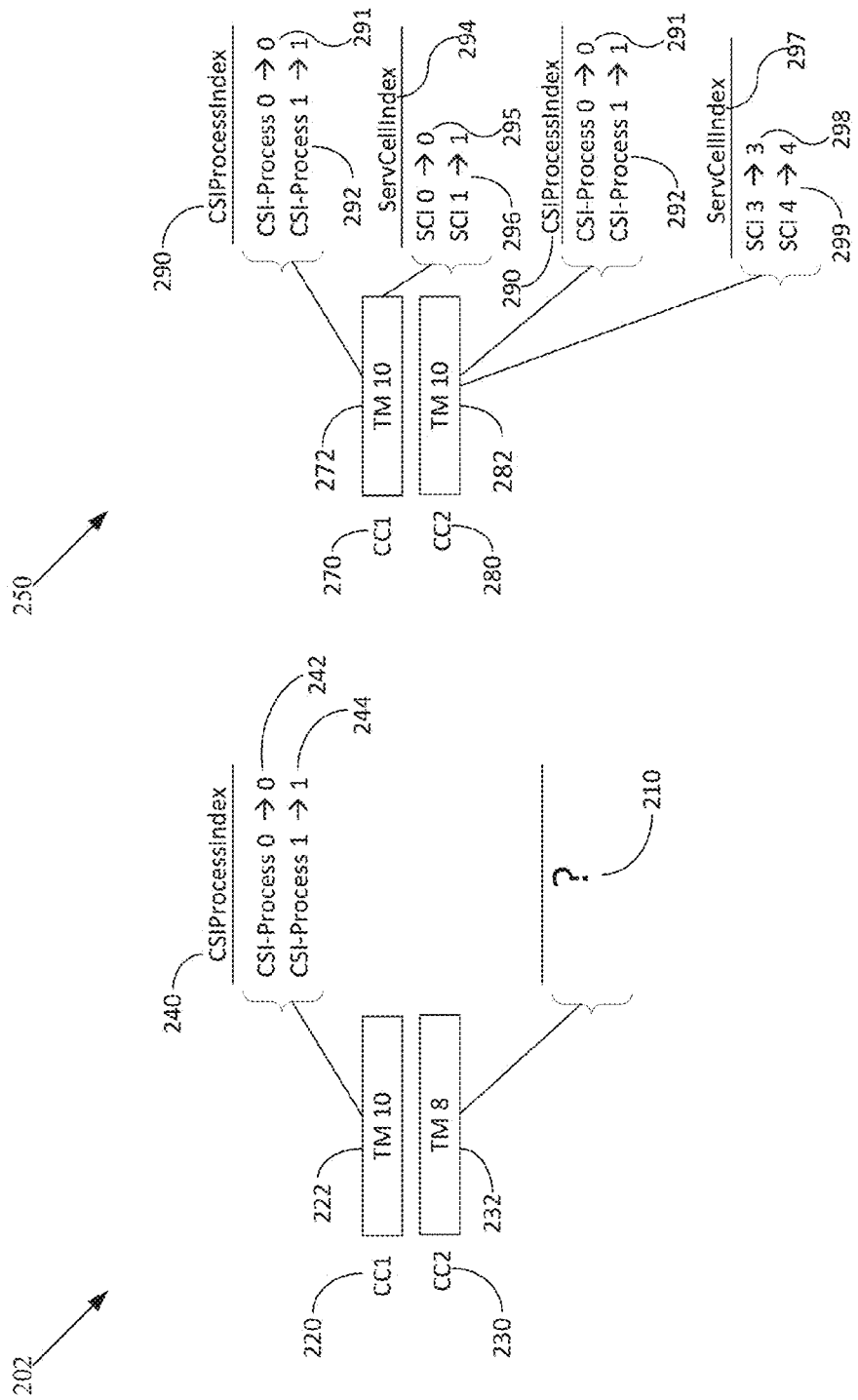

CHANNEL STATE INFORMATION FEEDBACK SCHEME FOR COOPERATIVE MULTI POINT TRANSMISSION AND CARRIER AGGREGATION SCENARIO

CLAIM OF PRIORITY

This application is a U.S. National Stage Filing under 35 U.S.C. 371 from International Application Number PCT/US2013/066786, filed on Oct. 25, 2013, which application claims the benefit of priority to U.S. Provisional Patent Application Ser. No. 61/721,436, filed on Nov. 1, 2012, which applications are incorporated herein by reference in their entirety.

BACKGROUND

The spectral efficiency of LTE may be increased through the simultaneous transmission of cooperative multi point (CoMP) and carrier aggregation (CA) targeting. Carrier aggregation (CA) allows the combination of two or more carrier channels into an aggregated channel, thus enabling higher throughput as well as more efficient use of the highly fragmented LTE spectrum. A carrier aggregation configuration is defined as a set of one or more operating bands across which the BS aggregates carriers with a specific set of parameters. CoMP is a DL/UL orthogonalization technique to improve system capacity and cell edge user throughput. Currently, there are two different approaches for CoMP techniques. One approach is a decentralized autonomous control based on an independent eNB architecture, and the other is a centralized control based on remote radio equipment (RRE) architecture, which is also known as remote radio head (RRH).

There are practical benefits of simultaneously supporting CoMP and CA. For example, a macro eNB (evolved node B) may be deployed with a first component carrier (CC) while remote radio heads (RRHs) may be deployed with a second CC. For the user equipment (UE) at the cell-edge, between two RRHs, it is possible to benefit from the utilizing CoMP and CA simultaneously by configuring different transmission modes (TMs) on each of the CCs. Further, where two CCs are deployed in each of two macrocells, both CoMP and CA may be deployed and potentially COMP transmission for a UE at a cell-edge between two macro cells, e.g., transmission mode (TM) 10 may be deployed on both of CCs, wherein TM 10 provides non-codebook-based precoding supporting up to eight layers (suitable for CoMP), TM9 may be used to support transmission up to 8 layers from a cell, while TM10 supports CoMP transmissions from one or more cells. CoMP transmission can be signaled to the UE with a combination of semi-static Radio Resource Control (RRC) signaling and dynamic signaling through a physical downlink control channel (PDCCH).

Different transmission modes may be applied to downlink signals depending on what use the transmission mode makes of transmit diversity, spatial multiplexing, cyclic delay diversity (CDD), etc. Downlink channel quality is assessed at the UE and may be reported via the channel state information (CSI) Information Element (IE). The PUCCH (physical uplink control channel) is used to carry CSI (channel state information) reports regarding channel conditions, which allow a transmission point, e.g., an eNB, to dynamically adjust the downlink signal to the varying propagating and interference conditions.

Accordingly, the transmission modes and schemes, as well as the PUCCH CSI configurations, for different CCs may be independently configured and may well be very different in terms of, for example, periodicity. A collision between two or more CSI reports of different "CSI report sets" with the same set of PUCCH reporting instances is hard to mitigate without very stringent scheduler restrictions. For example, a periodic CSI collision may happen when the periodicity of one CC is a multiple of the other one, e.g., 10 ms and 40 ms, and the configured offset is the same. A periodic CSI collision may also occur when the periodicity of one CC is not a multiple of the other one, e.g., 20 ms and 32 ms, and for certain configured offsets.

A CSIProcessIndex is used to identify multiple CSI processes within a given CC. In order to support the feedback configuration and reporting for simultaneous CA and CoMP, a ServCellIndex is included to indicate the configured CC. The CSIProcessIndex is a parameter that is used for the CSI dropping rules in a CoMP scenario in case of collision between CSI reports of different serving cells with PUCCH reporting type of the same priority. Thus, a CSI dropping rule may be used for the scenario where TM 10 is configured for the CCs because the CSIProcessIndex is available for each serving cell with TM 10 configuration. However, the CSIProcessIndex is unspecified for legacy TMs (TMs 1-9) and thus handling CSI collisions for a hybrid TM case poses problems where a hybrid combination of legacy TMs and TM 10 is configured for CCs of one particular UE.

BRIEF DESCRIPTION OF THE DRAWINGS

FIGS. 2a-b illustrate CSIProcessIndex configurations for a CA and CoMP arrangement according to embodiments;

DETAILED DESCRIPTION

Figure 1B:
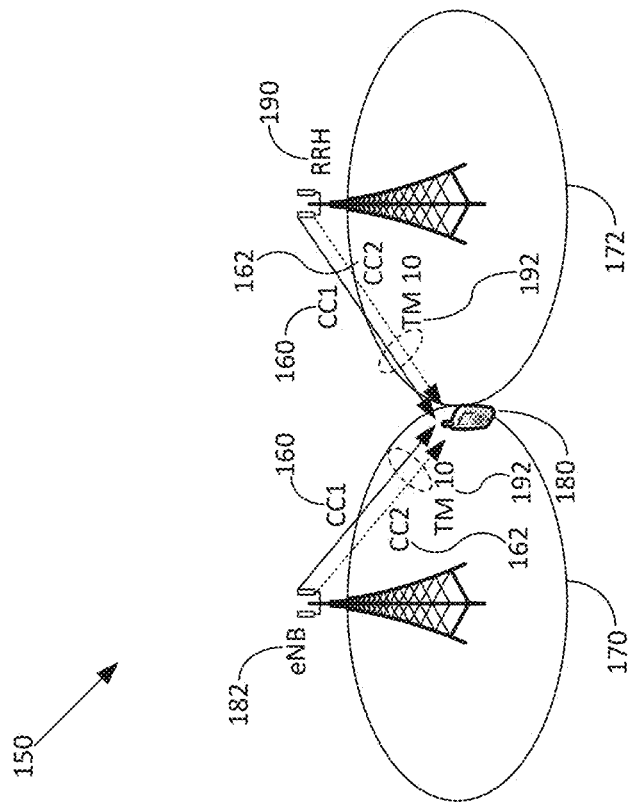
FIGS. 1a-b illustrates scenarios for simultaneous CoMP and CA according to an embodiment.
Figure 1A:
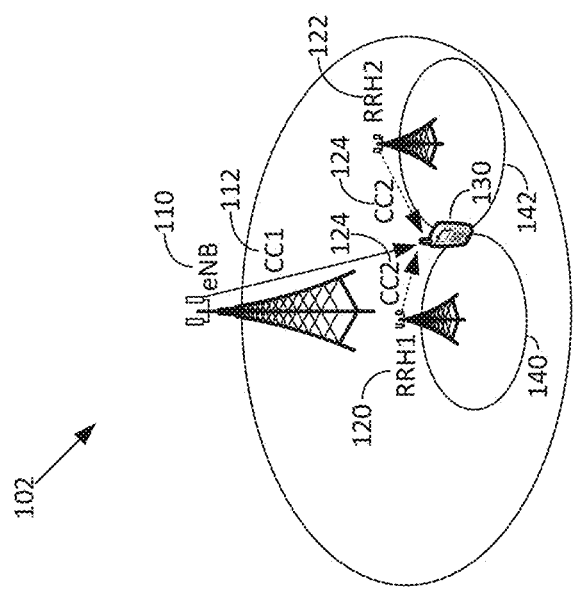

Embodiments described herein address the collision handling for periodic CSI reports in cooperative multi point (CoMP) and carrier aggregation (CA) scenarios when hybrid transmission/mixed modes are configured on different component carriers (CCs) for a given user equipment (UE). Rules are used to prioritize which downlink (DL) carrier is reported in case of collision in a given subframe for the CoMP and CA scenario FIGS. 1a-b illustrates scenarios for simultaneous CoMP and CA according to an embodiment. FIGS. 1a-b show the practical benefits of simultaneously supporting CoMP and CA in two scenarios, e.g. heterogeneous 102 and homogeneous 150 networks, respectively. In FIG. 1a, a macro eNB (evolved node B) 110 is deployed with CC1 (component carrier 1) 112 while RRH1 (remote radio head 1) 120 and RRH2 122 are deployed with CC2 124. In FIG. 1a, the user equipment (UE) 130 is shown near an edge of two subcells 140, 142. CC2 124 is used to provide a first signal from RRH1 120 to the UE 130 and to provide a second signal to the UE 130 from RRH2 122. The eNB 110 uses CC1 112 to provide signaling to the UE 130. For the UE 130 at the cell-edge between RRH1 120 and RRH2 122, it is possible to benefit from the utilizing CoMP and CA simultaneously by configuring different transmission mode (TM) on the CCs 112, 124. Thus, a different TM is used on different CCs 112, 124.

In FIG. 1b, the homogenous network 150 includes two CCs 160, 162 that are deployed in each macrocell 170, 172, e.g., CC1 160 and CC2 162 are provided to the UE 180 by eNB 182. RRH 190 also provides CC1 160 and CC2 162 to UE 180. For the cell-edge UE 180 between the two macro cells 170, 172, both CoMP and CA may be deployed and potentially COMP transmission, e.g., TM 10 192 may be deployed on both CC1 160 and CC2 162.

FIGS. 2a-b illustrate CSIProcessIndex configurations for a CA and CoMP arrangement according to embodiments. In FIG. 2a, a hybrid TM configuration 202 for CCs is shown. FIG. 2b shows a configuration 250 wherein TM 10 is configured for the CCs. Similar to the use of multiple CCs for CA, transmission modes and schemes, as well as the PUCCH (physical uplink control channel) CSI (channel state information) configurations for different CCs, are independently configured and may well be very different in terms of, for example, periodicity.

Collisions between 2 or more CSI reports may occur between CSI report sets with or without the same set of PUCCH reporting instances. Given the limited capacity of PUCCH, a dropping rule for types of collisions, e.g., intra-CSI process collisions of feedback reports and inter-CSI process collisions of feedback reports, may be used to prioritize which DL carrier is reported in case of collision in a given subframe for the COMP and CA scenario. A dropping rule according to an embodiment may include the following priority order based on reporting type and CSI process/CC index:

Reporting type (1st)→CSI process index (2nd)→CC index (3rd).

If the UE is configured with more than one serving cell, the UE may transmit a CSI report of one serving cell in any given subframe. For a given subframe, in case of collision of a CSI report with PUCCH reporting type 3, 5, 6, or 2a of one serving cell with a CSI report with PUCCH reporting type 1, 1a, 2, 2b, 2c, or 4 of another serving cell, the latter CSI with PUCCH reporting type (1, 1a, 2, 2b, 2c, or 4) has lower priority and is dropped. For a given subframe, in case of collision of CSI report with PUCCH reporting type 2, 2b, 2c, or 4 of one serving cell with CSI report with PUCCH reporting type 1 or 1a of another serving cell, the latter CSI report with PUCCH reporting type 1, or 1a has lower priority and is dropped.

However, a collision between 2 or more CSI reports of different CSI report sets with the same set of PUCCH reporting instances is hard to mitigate without very stringent scheduler restrictions. For example, the periodic CSI collision may happen when the periodicity of one CC is a multiple of the other one, e.g., 10 ms and 40 ms, and the configured offset is the same. In addition, a periodic CSI collision may occur when the periodicity of one CC is not a multiple of the other one, e.g., 20 ms and 32 ms, and for certain configured offsets.

In FIG. 2a, management of CSI collision issues for the hybrid TM case is unspecified for legacy TMs, i.e., TMs 1-9, and the CSIProcessIndex is not taken into account 210. More specifically, CC1 220 uses TM 10 222 and CC2 230 uses TM 8 232. The CSIProcessIndex 240 for TM 10 222 is shown to include CSI-Process 0→0 242 and CSI-Process 1→1 244. However, the CSIProcessIndex 240 for transmission mode 8 232 is not available 210. In FIG. 2b, CC1 270 uses TM 10 272 and CC2 280 uses TM 10 282. The CSIProcessIndex 290 for each of TM 10 272 and TM 10 282 are shown to include CSI-Process 0→0 291 and CSI-Process 1→1 292. The ServCellIndex 294 for the TM 10 272 is shown to include ServCellIndex (SCI) 0→0 295 and ServCellIndex (SCI) 1→1 296. The ServCellIndex 297 for the TM 10 282 is shown to include ServCellIndex (SCI) 3→3 298 and ServCellIndex (SCI) 4→4 299.

For a given subframe and UE using CC1 270 with TM 10 272 and CC2 280 with TM 10 282, in case of collision between CSI reports of different serving cells with PUCCH reporting type of the same priority and the CSI reports corresponding to CSI processes with same CSIProcessIndex 290, the CSI reports of the serving cells, except the serving cell with lowest ServCellIndex 290, 294, are dropped. For a given subframe and UE using CC1 270 with TM 10 272 and CC2 280 with TM 10 282, in case of collision between CSI reports of different serving cells with PUCCH reporting type of the same priority and the CSI reports corresponding to CSI processes with different CSIProcessIndex 290, the CSI reports of the serving cells, except the serving cell with CSI reports corresponding to CSI process with the lowest CSIProcessIndex 290, are dropped.

The CSIProcessIndex parameters 290 plays a role in the CSI dropping rule for CoMP scenario in case of collision between CSI reports of different serving cells with PUCCH reporting type of the same priority. Thus, the CSIProcessIndex 290 provides an effective tool for an eNB scheduler to improve the COMP performance in practice. For example, when dynamic point selection (DPS) is implemented, wherein the transmission point is varied according to changes in channel and interference conditions, eNB could assign the smallest CSIProcessIndex 290 to the transmission point (TP) with the higher geometry to optimize the DPS COMP performance Therefore, the CSI dropping rule described above works well for the scenario as shown in FIG. 1b and FIG. 2b where TM 10 192, 272, 282 are configured for CCs 160, 162, 270, 280 because the CSIProcessIndex 290 is available, i.e., for each serving cell with TM 10 configurations 272, 282.

But in FIG. 1a and FIG. 2a, a hybrid combination of legacy TMs 232 and TM 10 222 is configured for CCs 220, 230 of one particular UE, e.g., TM 10 222 is used on CC1 220 and TM 8 232 is used on CC2 230. Thus, it is still unclear how to handle the CSI collision issue for the hybrid TM case, taking into account CSIProcessIndex 240 is unspecified 210 for the legacy TM. e.g., TM 8 232 shown in FIG. 2a.

Figure 3:
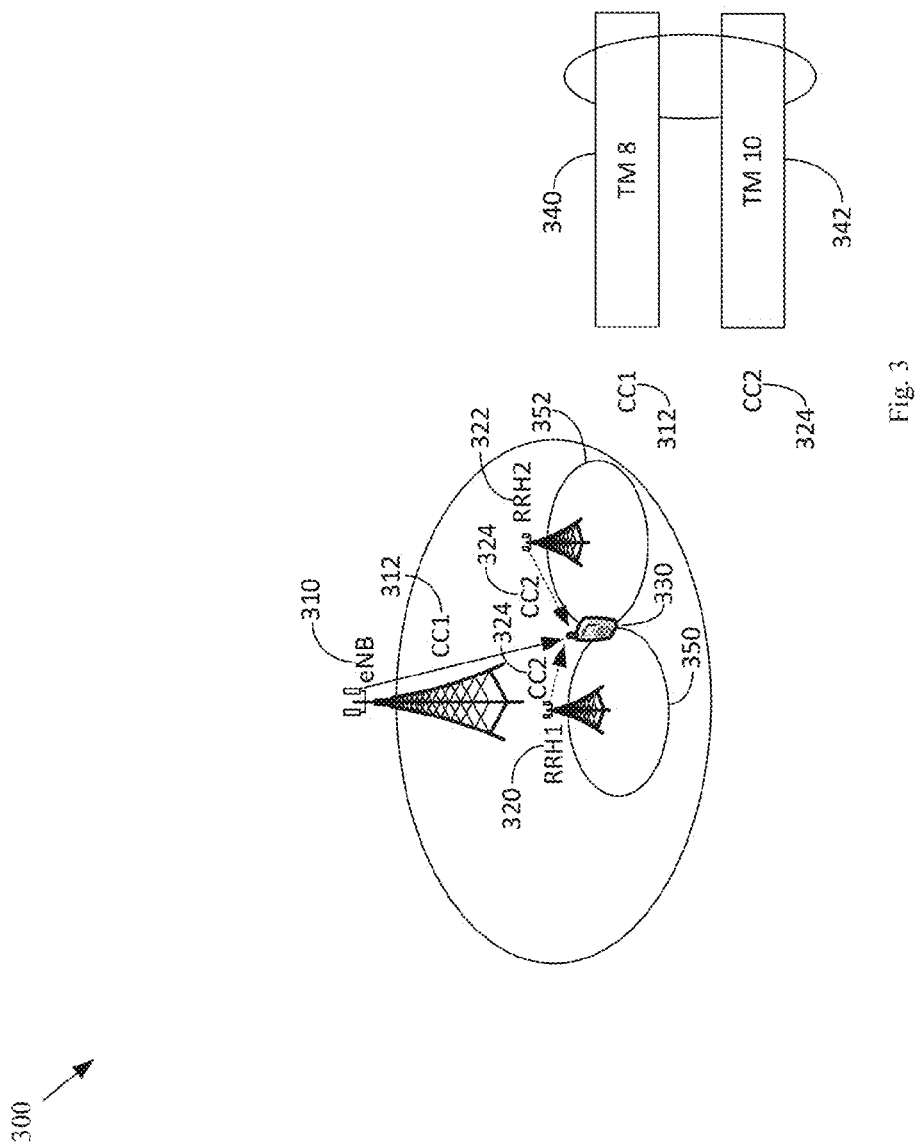
FIG. 3 illustrates a hybrid TM configuration in a heterogeneous network according to an embodiment.

FIG. 3 illustrates a hybrid TM configuration in a heterogeneous network 300 according to an embodiment. In FIG. 3, the UE 330 is shown near an edge of two subcells 350, 352. CC2 324 uses TM 10 342 to provide a first signal from RRH1 320 to the UE 330 and to provide a second signal to the UE 330 from RRH2 322. The eNB 310 uses CC1 312 and TM 8 340 to provide signaling to the UE. Accordingly, FIG. 3 shows a UE 330 is configured with different TMs 340, 342 on different serving cells. Embodiments, described herein, address the collision handling for periodic CSI report in CoMP and CA scenario when hybrid transmission/mixed modes are configured on different CCs 312, 324 for a given UE 330.

An embodiment is provided in case of collision between CSI reports of different serving cells with a PUCCH reporting type having the same priority. The CSI for TM 1-9 340 is (Alternative 1, see below) or conditionally (Alternative 2, see below) given higher priority than TM 10 342. This embodiment involves a scenario when the UE 330 is configured with more than one serving cell, e.g., CC1 312 and CC2 324, and at least one serving cell is configured with TM 10 342 and at least one serving cell is configured with TM 1-9 340. In this scenario, the CSI for TM 1-9 340 is given higher priority than TM 10 342 based on a selected rule.

Figure 4:
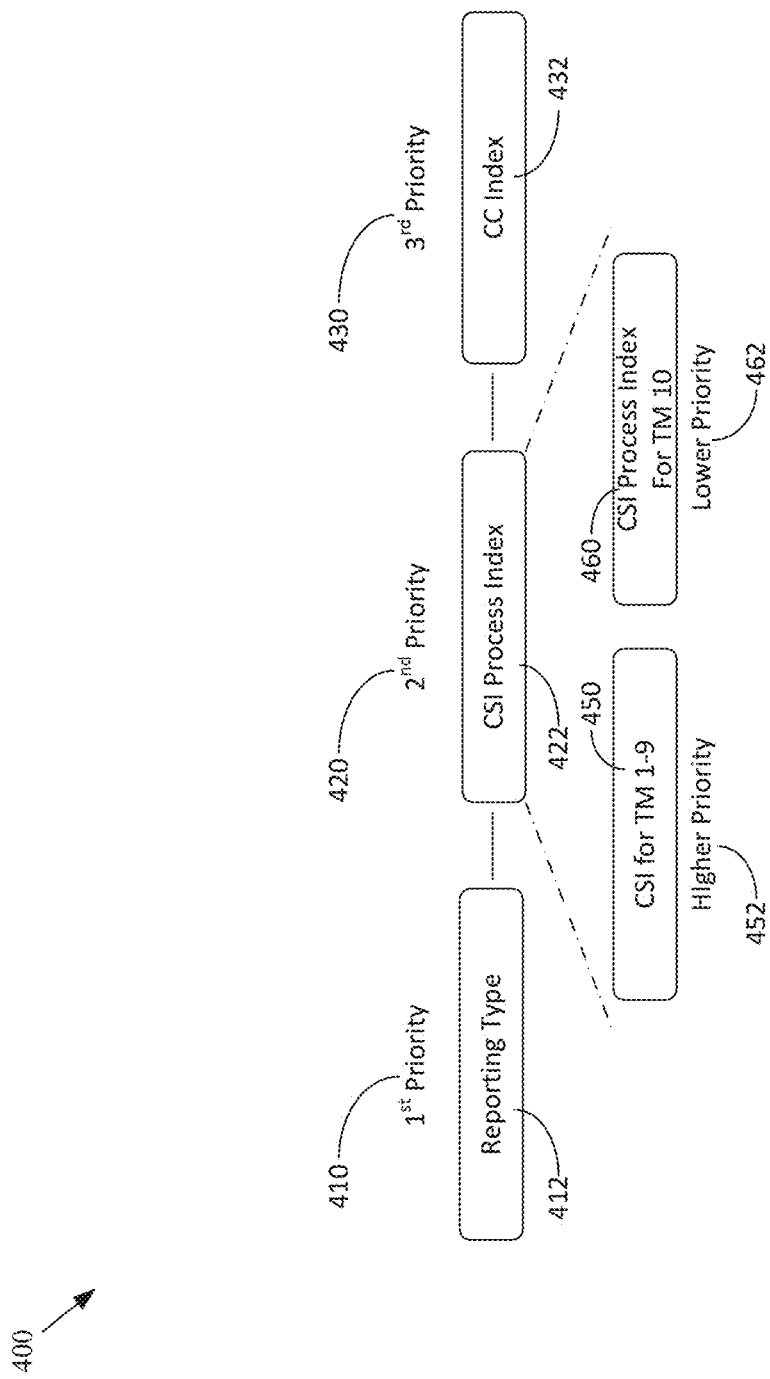
FIG. 4 illustrate priority ranking for CSI dropping rules for a hybrid TM case according to one alternative dropping rule set according to an embodiment.

FIG. 4 illustrate priority ranking for CSI dropping rules 400 for a hybrid TM case according to one alternative dropping rule set according to an embodiment. In FIG. 4, a 1st priority 410, 2nd priority 420 and 3rd priority 430 are shown. The 1st priority 410 is associated with the reporting type 412. The 2nd priority 420 is associated with the CSI process index 422. The third priority 430 is associated with the CC index 432. According to the second priority 420 based on the CSI process index 422, the CSI report associated with TM 1-9 450 is given a higher priority 452 than the lower priority 462 for CSI report associated with CSI process index for TM 10 460.

Figure 5A:
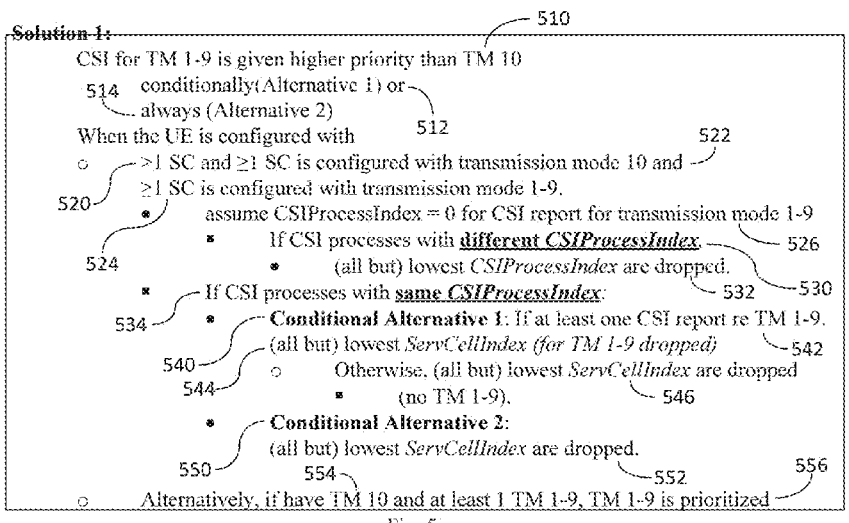
FIGS. 5a-c illustrate dropping rules for a hybrid TM case with a with PUCCH reporting type of the same priority according to an embodiment.
Figure 5B:
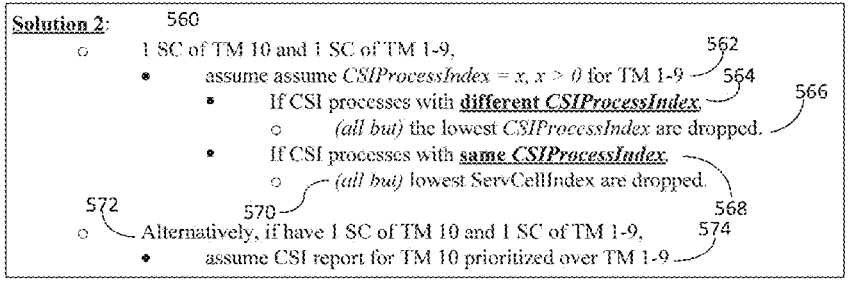
Figure 5C:
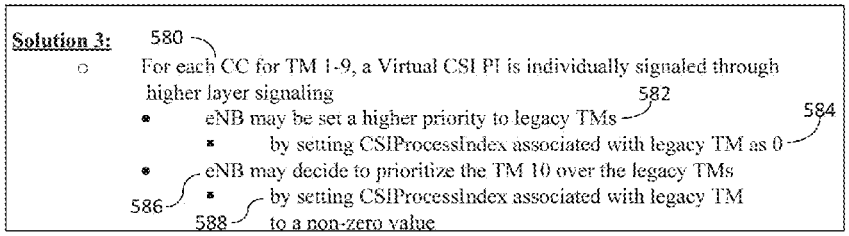

FIGS. 5a-c illustrate dropping rules for a hybrid TM case with a with PUCCH reporting type of the same priority according to an embodiment. Thus, as shown in FIG. 4, the first priority 410 is not applicable and the second 420 and third 430 priorities are used. According to the dropping rule shown in FIG. 5a, for a given subframe, the CSI report for TM1-9 is given higher priority than the CSI report for TM 10 510 conditionally 512 or always 514.

More specifically, when the UE is configured with more than one servicing cell 520, i.e., more than one CC, and one or more serving cell is configured with TM 10 522 and one or more serving cell is configured with TM 1-9 524, the UE may assume CSIProcessIndex=0 for CSI report for TM 1-9 526 to handle the collision between CSI reports of different serving cells.

In case of collision between CSI reports of different serving cells with PUCCH reporting type of the same priority and the CSI reports corresponding to CSI processes with different CSIProcessIndex 530, the CSI reports of the serving cells except the serving cell with CSI reports corresponding to CSI process with the lowest CSIProcessIndex are dropped 532. In case of collision between CSI reports of different serving cells with PUCCH reporting type of the same priority and the CSI reports corresponding to CSI processes with same CSIProcessIndex 534, two conditional alternatives are provided, conditional alternative one 540 and conditional alternative two 550.

First, if at least one CSI reports corresponding to TM 1-9 is in the given subframe 542, the CSI reports of the serving cells except the serving cell with lowest ServCellIndex of CSI reports corresponding to CSI for TM 1-9 are dropped 544. Otherwise, the CSI reports of the serving cells except the serving cell with lowest ServCellIndex are dropped 546. The second conditional alternative involves the CSI reports of the serving cells except the serving cells with the lowest ServCellIndex are dropped 552.

Alternatively, i.e., for the always alternative 514. for a given subframe and UE in TM 10 for one serving cell and in TM 1-9 at least for the other serving cell 554, UE may assume CSI report for TM 1-9 is prioritized over CSI report for TM 10 556 to handle the collision between CSI reports of different serving cells. It means CSI report for TM 10 is dropped when there is collision between CSI reports of different serving cells.

Another embodiment is provided in the case where a given subframe and UE may be configured with TM 10 for one serving cell and with TM 1-9 at least for the other serving cell 560, the UE may assume CSIProcessIndex=x for x>0 for TM 1-9 562. If the CSI processes are associated with different CSIProcessIndex 564, all but the lowest CSIProcessIndex may be dropped 566. For example, a value of 4 may be used. If the CSI processes are associated with the same CSIProcessIndex 568, all but the lowest ServCellIndex may be dropped 570.

Alternatively, if there are one or more serving cell with at least one with TM 10 and if there are one or more serving cells with TM 1-9 572, the UE may assume the CSI report for TM 10 is prioritized over TM 1-9 574.

The third solution involves the use of a virtual CSI process index. According to the third embodiment, the virtual CSI process index for each CC configured with a legacy TM, i.e., TM 1-9, is individually signaled through higher layer signaling 580. This embodiment has the benefit of providing more flexibility for the eNB scheduler to semi-statically reconfigure the priority of legacy TMs in various simultaneous CoMP and CA scenarios. For example, eNB may be assumed to be initially set a higher priority for the legacy TMs over TM 10 582 by setting CSIProcessIndex associated with legacy TM as 0 584. The UE may be informed through RRC signaling. However, if later eNB decides to prioritize the TM 10 over the legacy TMs 586, then CSIProcessIndex associated with legacy TM may be reset from 0 to 4 or other non-zero value 588, and the updated value may be transmitted through RRC signaling.

Figure 6:
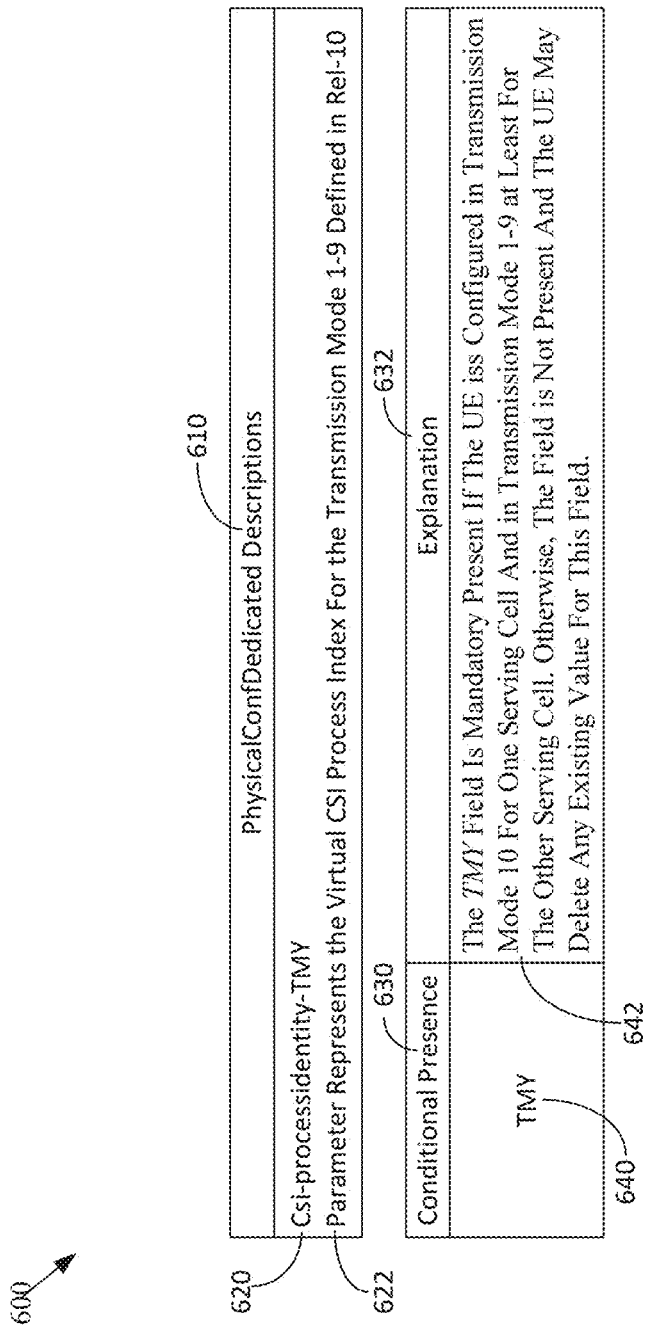
FIG. 6 illustrates RRC signaling structure according to an embodiment.

FIG. 6 illustrates RRC signaling structure 600 according to an embodiment. In FIG. 6, the PhysicalConfigDedicated information element may include dedicated physical configuration descriptions 610. For example, csiprocessidentity-TMY (Transmission Mode hYbrid) 620 may be included to provide a parameter representing the virtual CSI process index for the TM 1-9 622, e.g., as defined in Rel-10. A conditional presence indicator field 630 may also be provided and operates according to an explanation 632. The conditional presence includes TMY field 640. A description 642 is provided to explain the use of the TMY field 640. For example, in FIG. 6, the TMY field 640 is present if the UE is configured in TM 10 for one serving cell and in TM 1-9 at least for the other serving cell; otherwise the field is not present and the UE may delete any existing value for this field 642.

Figure 7:
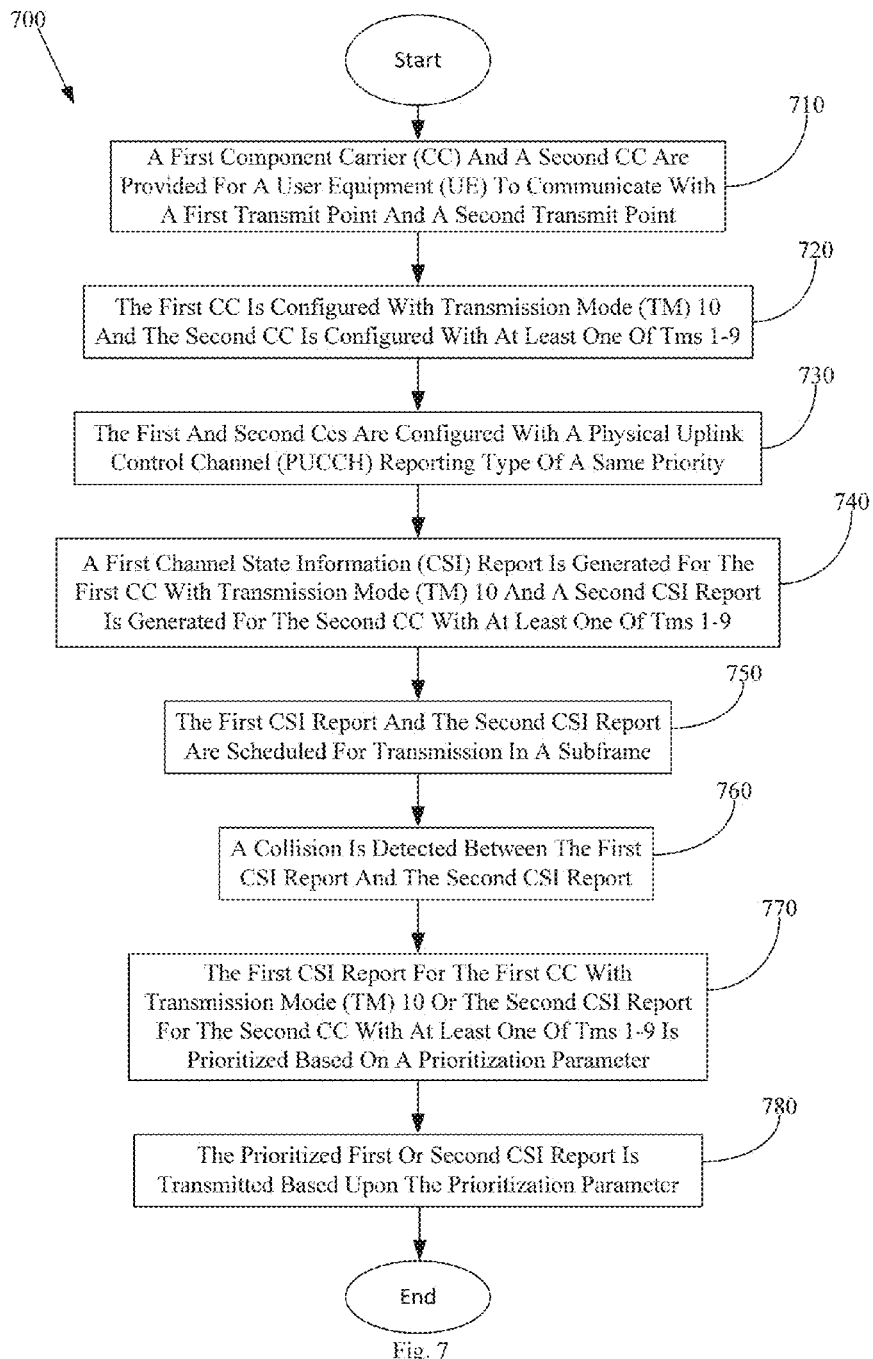
FIG. 7 is a flowchart of a method for reporting uplink control information (UCI) using a channel state information feedback scheme for cooperative multi point transmission and carrier aggregation scenarios according to an embodiment.

FIG. 7 is a flowchart 700 of a method for reporting uplink control information (UCI) using a channel state information feedback scheme for cooperative multi point transmission and carrier aggregation scenarios according to an embodiment. A first component carrier (CC) and a second CC are provided for a user equipment (UE) to communicate with a first transmit point and a second transmit point 710. The first CC is configured with TM (TM) 10 and the second CC is configured with at least one of TMs 1-9 720. The first and second CCs are configured with a physical uplink control channel (PUCCH) reporting type of a same priority 730. A first channel state information (CSI) report is generated for the first CC with TM (TM) 10 and a second CSI report is generated for the second CC with at least one of TMs 1-9 740. The first CSI report and the second CSI report are scheduled for transmission in a subframe 750. A collision is detected between the first CSI report and the second CSI report 760. The first CSI report for the first CC with TM (TM) 10 or the second CSI report for the second CC with at least one of TMs 1-9 is prioritized based on a prioritization parameter 770. The prioritized first or second CSI report is transmitted based upon the prioritization parameter 780.

Figure 8:
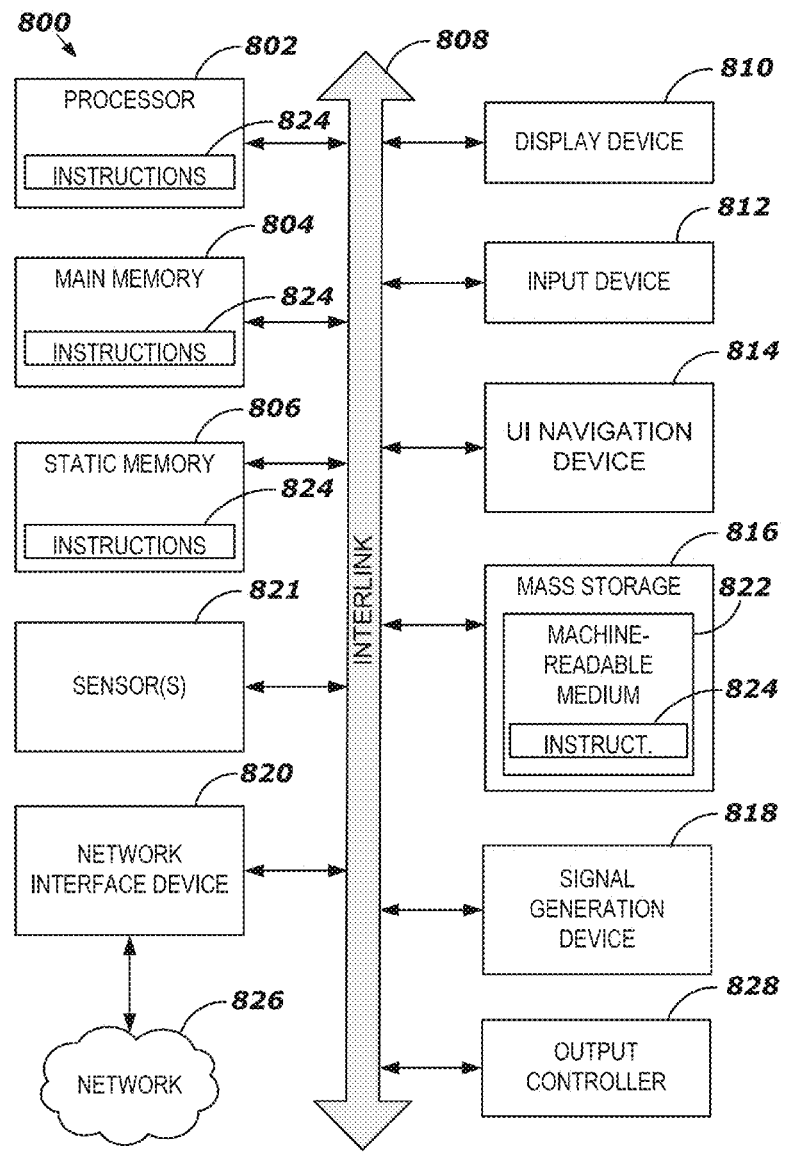
FIG. 8 illustrates a block diagram of an example machine for reporting uplink control information (UCI) using a channel state information feedback scheme for cooperative multi point transmission and carrier aggregation scenarios according to an embodiment.

FIG. 8 illustrates a block diagram of an example machine 800 for reporting uplink control information (UCI) using a channel state information feedback scheme for cooperative multi point transmission and carrier aggregation scenarios, according to an embodiment, upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine and/or a client machine in server-client network environments. In an example, the machine 800 may act as a peer machine in peer-to-peer (P2P) (or other distributed) network environment. The machine 800 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 802 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 802 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 800 may include a hardware processor 802 (e.g., a central processing unit (CPU), a graphics processing unit (GPU), a hardware processor core, or any combination thereof), a main memory 804 and a static memory 806, at least some of which may communicate with others via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR)) connection to communicate or control one or more peripheral devices (e.g., a printer, card reader, etc.).

The storage device 816 may include at least one machine readable medium 822 on which is stored one or more sets of data structures or instructions 824 (e.g., software) embodying or utilized by any one or more of the techniques or functions described herein. The instructions 824 may also reside, at least partially, additional machine readable memories such as main memory 804, static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) that configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols. Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Additional Notes & Examples:

Example 1 may include subject matter (such as a method or means for performing acts) for providing a first component carrier (CC) configured with transmission mode (TM) 10 and a second CC configured with at least one of TMs 1-9 for a user equipment (UE) to communicate with a first transmit point and a second transmit point;
 configuring the first and second CCs with a physical uplink control channel (PUCCH) reporting type of a same priority;
 generating a first channel state information (CSI) report for the first CC and a second CSI report for the second CC;
 detecting a collision between a scheduled transmission of the first CSI report and the second CSI report in a subframe;
 prioritizing the first CSI report for the first CC or the second CSI report for the second CC based on a prioritization parameter; and
 transmitting the first or second CSI report based upon the prioritizing of the first CSI report and the second report using the prioritization parameter.

Example 2 may optionally include the subject matter of Example 1, wherein the prioritizing the first CSI report or the second CSI report based on the prioritization parameter comprises prioritizing the first CSI report or the second CSI report based on a default control value indicating prioritization of the second CSI report for the second CC associated with TMs 1-9 over the priority of the first CSI report for the first CC with TM 10, the second CSI report being transmitted.

Example 3 may optionally include the subject matter of Example 1 or 2, wherein the prioritizing the first CSI report or the second CSI report based on the prioritization parameter comprises prioritizing the first CSI report or the second CSI report based on a default control value indicating prioritization of the first CSI report for the first CC with TM 10 over the second CSI report for the second CC associated with TMs 1-9, the first CSI report being transmitted.

Example 4 may optionally include the subject matter of one or more of Examples 1-3, wherein the prioritizing the first CSI report or the second CSI report based on the prioritization parameter comprises:
 identifying the first CC associated with TM 10 and the second CC associated with TMs 1-9 with CSI process indices;
 setting the CSI process index of the second CC associated with TMs 1-9 to be equal to zero;
 determining CSI process indices associated with the first CC with TM 10 and the second CC associated with TMs 1-9 are different; and
 prioritizing the first CSI report or the second CSI report having a lowest CSI process index.

Example 5 may optionally include the subject matter of one or more of Examples 1-4, wherein the prioritizing the first CSI report or the second CSI report based on the prioritization parameter comprises:
 identifying the first CC with TM 10 and the second CC associated with TMs 1-9 with CSI process indices and serving cell indices;
 setting the CSI process index of the second CC associated with TMs 1-9 to be equal to zero;
 determining CSI process indices associated with the first CC with TM 10 and the second CC associated with TMs 1-9 are the same; and
 prioritizing the first CSI report or the second CSI report having a lowest serving cell index.

Example 6 may optionally include the subject matter of one or more of Examples 1-5, wherein the prioritizing the first CSI report or the second CSI report based on the prioritization parameter comprises:
 identifying the first CC with TM 10 and the second CC associated with TMs 1-9 with CSI process indices and serving cell indices;
 setting the CSI process index of the second CC associated with TMs 1-9 to be equal to zero; and
 prioritizing the second CSI report over the first CSI report.

Example 7 may optionally include the subject matter of one or more of Examples 1-6, wherein the prioritizing the first CSI report or the second CSI report based on the prioritization parameter comprises:
 identifying the first CC associated with TM 10 and the second CC associated with TMs 1-9 with CSI process indices;
 setting the CSI process index of the second CC associated with TMs 1-9 to be greater than zero;
 determining CSI process indices associated with the first CC with TM 10 and the second CC associated with TMs 1-9 are different; and
 prioritizing the first CSI report or the second CSI report having a lowest CSI process index.

Example 8 may optionally include the subject matter of one or more of Examples 1-7, wherein the prioritizing the first CSI report or the second CSI report based on the prioritization parameter comprises:
 identifying the first CC with TM 10 and the second CC associated with TMs 1-9 with CSI process indices and serving cell indices;
 setting the CSI process index of the second CC associated with TMs 1-9 to be greater than zero;
 determining CSI process indices associated with the first CC with TM 10 and the second CC associated with TMs 1-9 are the same; and
 prioritizing the first CSI report or the second CSI report having a lowest serving cell index.

Example 9 may optionally include the subject matter of one or more of Examples 1-8, wherein the prioritizing the first CSI report or the second CSI report based on the prioritization parameter comprises assigning a virtual CSI process index equal to zero for at least one of TMs 1-9 to provide the second CSI report a highest priority and assigning a virtual CSI process index equal to a non-zero value for at least one of TMs 1-9 to provide the first CSI report a highest priority.

Example 10 includes subject matter (such as a device, apparatus, client or system) including a processor; and memory in electronic communication with the processor; arranged to store instructions executable by the processor to:

generate a first channel state information (CSI) report for a first component carrier (CC) with transmission mode (TM) 10 and a second CSI report for a second CC with at least one of TMs 1-9, the first and second CCs having a physical uplink control channel (PUCCH) reporting type of a same priority;

detect a collision between a scheduled transmission of the first CSI report and the second CSI report in a subframe; and transmit the first or second CSI report based upon a prioritizing of the first CSI report and the second report using a prioritization parameter.

Example 11 may optionally include the subject matter of Example 10, wherein the prioritization parameter comprises a default control value indicating prioritization of the second CSI report for the second CC associated with TMs 1-9 over the first CSI report for the first CC with transmission mode (TM) 10.

Example 12 may optionally include the subject matter of Example 10 or 11, wherein the prioritization parameter comprises a default control value indicating prioritization of the first CSI report for the first CC with TM 10 over the second CSI report for the second CC associated with TMs 1-9.

Example 13 may optionally include the subject matter of one or more of Examples 10-12, wherein processor prioritizes the first CSI report or the second CSI report based on the prioritization parameter by identifying the first CC associated with TM 10 and the second CC associated with TMs 1-9 with CSI process indices, setting the CSI process index of the second CC associated with TMs 1-9 to be equal to zero, determining CSI process indices associated with the first CC with TM 10 and the second CC associated with TMs 1-9 are different and prioritizing the first CSI report or the second CSI report having a lowest CSI process index.

Example 14 may optionally include the subject matter of one or more of Examples 10-13, wherein processor prioritizes the first CSI report or the second CSI report based on the prioritization parameter by identifying the first CC with TM 10 and the second CC associated with TMs 1-9 with CSI process indices and serving cell indices, setting the CSI process index of the second CC associated with TMs 1-9 to be equal to zero, determining CSI process indices associated with the first CC with TM 10 and the second CC associated with TMs 1-9 are the same and prioritizing the first CSI report or the second CSI report having a lowest serving cell index.

Example 15 may optionally include the subject matter of one or more of Examples 10-14, wherein processor prioritizes the first CSI report or the second CSI report based on the prioritization parameter by identifying the first CC with TM 10 and the second CC associated with TMs 1-9 with CSI process indices and serving cell indices, setting the CSI process index of the second CC associated with TMs 1-9 to be equal to zero, and prioritizing the second CSI report over the first CSI report.

Example 16 may optionally include the subject matter of one or more of Examples 10-15, wherein processor prioritizes the first CSI report or the second CSI report based on the prioritization parameter by identifying the first CC associated with TM 10 and the second CC associated with TMs 1-9 with CSI process indices, setting the CSI process index of the second CC associated with TMs 1-9 to be greater than zero, determining CSI process indices associated with the first CC with TM 10 and the second CC associated with TMs 1-9 are different and prioritizing the first CSI report or the second CSI report having a lowest CSI process index.

Example 17 may optionally include the subject matter of one or more of Examples 10-16, wherein processor prioritizes the first CSI report or the second CSI report based on the prioritization parameter by identifying the first CC with TM 10 and the second CC associated with TMs 1-9 with CSI process indices and serving cell indices, setting the CSI process index of the second CC associated with TMs 1-9 to be greater than zero, determining CSI process indices associated with the first CC with TM 10 and the second CC associated with TMs 1-9 are the same and prioritizing the first CSI report or the second CSI report having a lowest serving cell index.

Example 18 may optionally include the subject matter of one or more of Examples 10-17, wherein the processor prioritizes the first CSI report or the second CSI report based on the prioritization parameter by assigning a virtual CSI process index equal to zero for at least one of TMs 1-9 to provide the second CSI report a highest priority and assigning a virtual CSI process index equal to a non-zero value for at least one of TMs 1-9 to provide the first CSI report a highest priority.

Example 19 may include subject matter (such as means for performing acts or machine readable medium including instructions that, when executed by the machine, cause the machine to perform acts) including providing a first component carrier (CC) and a second CC for a user equipment (UE) to communicate with a first transmit point and a second transmit point;

configuring the first CC with transmission mode (TM) ten and the second CC with at least one of TMs 1-9;

configuring the first and second CCs with a physical uplink control channel (PUCCH) reporting type of a same priority;

generating a first channel state information (CSI) report for the first CC with transmission mode (TM) ten and a second CSI report for the second CC with at least one of TMs 1-9;

scheduling the first CSI report and the second CSI report for transmission in a subframe;

detecting a collision between the first CSI report and the second CSI report;

prioritizing the first CSI report for the first CC with transmission mode (TM) ten or the second CSI report for the second CC with at least one of TMs 1-9 based on a prioritization parameter; and transmitting the first or second CSI report based upon the prioritizing of the first CSI report and the second report using the prioritization parameter.

Example 20 may optionally include the subject matter of Example 19, wherein the prioritizing the first CSI report or the second CSI report based on the prioritization parameter comprises prioritizing the first CSI report or the second CSI report based on a default control value indicating prioritization of the second CSI report for the second CC associated with TMs 1-9 over the first CSI report for the first CC with transmission mode (TM) ten.

Example 21 may optionally include the subject matter of Example 19 or 20, wherein the prioritizing the first CSI report or the second CSI report based on the prioritization parameter comprises prioritizing the first CSI report or the second CSI report based on a default control value indicating prioritization of the first CSI report for the first CC with TM 10 over the second CSI report for the second CC associated with TMs 1-9.

Example 22 may optionally include the subject matter of one or more of Examples 19-21, wherein the prioritizing the first CSI report or the second CSI report based on the prioritization parameter comprises:

identifying the first CC associated with TM 10 and the second CC associated with TMs 1-9 with CSI process indices;

setting the CSI process index of the second CC associated with TMs 1-9 to be equal to zero;

determining CSI process indices associated with the first CC with TM 10 and the second CC associated with TMs 1-9 are different; and prioritizing the first CSI report or the second CSI report having a lowest CSI process index.

Example 23 may optionally include the subject matter of one or more of Examples 19-22, wherein the prioritizing the first CSI report or the second CSI report based on the prioritization parameter comprises:

identifying the first CC with TM 10 and the second CC associated with TMs 1-9 with CSI process indices and serving cell indices;

setting the CSI process index of the second CC associated with TMs 1-9 to be equal to zero;

determining CSI process indices associated with the first CC with TM 10 and the second CC associated with TMs 1-9 are the same; and prioritizing the first CSI report or the second CSI report having a lowest serving cell index.

Example 24 may optionally include the subject matter of one or more of Examples 19-23, wherein the prioritizing the first CSI report or the second CSI report based on the prioritization parameter comprises:

identifying the first CC with TM 10 and the second CC associated with TMs 1-9 with CSI process indices and serving cell indices;

setting the CSI process index of the second CC associated with TMs 1-9 to be equal to zero; and prioritizing the second CSI report over the first CSI report.

Example 25 may optionally include the subject matter of one or more of Examples 19-24, wherein the prioritizing the first CSI report or the second CSI report based on the prioritization parameter comprises:

identifying the first CC associated with TM 10 and the second CC associated with TMs 1-9 with CSI process indices;

setting the CSI process index of the second CC associated with TMs 1-9 to be greater than zero;

determining CSI process indices associated with the first CC with TM 10 and the second CC associated with TMs 1-9 are different; and prioritizing the first CSI report or the second CSI report having a lowest CSI process index.

Example 26 may optionally include the subject matter of one or more of Examples 19-25, wherein the prioritizing the first CSI report or the second CSI report based on the prioritization parameter comprises:

identifying the first CC with TM 10 and the second CC associated with TMs 1-9 with CSI process indices and serving cell indices;

setting the CSI process index of the second CC associated with TMs 1-9 to be greater than zero;

determining CSI process indices associated with the first CC with TM 10 and the second CC associated with TMs 1-9 are the same; and prioritizing the first CSI report or the second CSI report having a lowest serving cell index.

Example 27 may optionally include the subject matter of one or more of Examples 19-26, wherein the prioritizing the first CSI report or the second CSI report based on the prioritization parameter comprises assigning a virtual CSI process index equal to zero for at least one of TMs 1-9 to provide the second CSI report a highest priority and assigning a virtual CSI process index equal to a non-zero value for at least one of TMs 1-9 to provide the first CSI report a highest priority.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for reporting uplink control information (UCI), comprising:

via an eNodeB:
providing a first component carrier (CC) and a second CC for a user equipment (UE) to communicate with a first transmit point and a second transmit point;
configuring the first CC with transmission mode (TM) 10 and the second CC with a legacy TM comprising at least one of TMs 1-9, the transmission modes comprising transmission modes of a Long Term Evolution (LTE) cellular network; and
configuring the first and second CCs with a physical uplink control channel (PUCCH) reporting type; and via the UE:
generating a first channel state information (CSI) report for the first CC with transmission mode (TM) 10 and a second CSI report for the second CC with the legacy TM;
scheduling the first CSI report and the second CSI report for transmission in a subframe;
detecting a collision between the first CSI report and the second CSI report;
transmitting a radio resource control (RRC) message in response to detecting the collision between the first CSI report and the second CSI report to indicate the UE has configured CCs comprising both TM 10 and the legacy TM; and
transmitting the first or second CSI report based upon a prioritizing of the first CSI report and the second CSI report using the TM of the CSI reports when the PUCCH reporting type of the first and second CCs comprise a same first priority and a process index of the first CSI report and a process index of the second CSI report comprise a same second priority.

2. The method of claim 1, further comprising:
via the UE, prioritizing the first CSI report or the second CSI report based on a default control value indicating prioritization of the second CSI report for the second CC with the legacy TM over the first CSI report for the first CC with TM 10, the second CSI report being transmitted.

3. The method of claim 1, further comprising:
via the UE:
prioritizing the first CSI report or the second CSI report based on a default control value indicating prioritization of the first CSI report for the first CC with TM 10 over the second CSI report for the second CC with the legacy TM, the first CSI report being transmitted.

4. The method of claim 1, further comprising:
via the UE:
identifying the first CC with TM 10 and the second CC with the legacy TM with CSI process indices of the first and second CSI reports;
setting the CSI process index of the second CC with the legacy TM to be equal to or greater than zero;
determining the CSI process indices with the first CC with TM 10 and the second CC with the legacy TM are different; and
prioritizing the first CSI report or the second CSI report having a lowest CSI process index.

5. The method of claim 1, further comprising:
via the UE:
identifying the first CC with TM 10 and the second CC with the legacy TM with CSI process indices and serving cell indices of the first and second CSI reports;
setting the CSI process index of the second CC with the legacy TM to be equal to or greater than zero;
determining the CSI process indices associated with the first CC with TM 10 and the second CC with the legacy TM are the same; and
prioritizing the first CSI report or the second CSI report having a lowest serving cell index.

6. The method of claim 1, further comprising:
via the UE:
identifying the first CC with TM 10 and the second CC with the legacy TM with CSI process indices and serving cell indices of the first and second CSI reports;
setting the CSI process index of the second CC with the legacy TM to be equal to zero; and
prioritizing the second CSI report over the first CSI report.

7. The method of claim 1, further comprising:
via the UE:
assigning a virtual CSI process index equal to zero for the second CC with the legacy TM to provide the second CSI report a highest priority; or
assigning a virtual CSI process index equal to a non-zero value for the second CC with the legacy TM to provide the first CSI report a highest priority.

8. A user equipment (UE) configured for reporting uplink control information (UCI), comprising:
a processor; and
memory in electronic communication with the processor;
instructions stored in the memory, the instructions being executable by the processor to:
generate a first channel state information (CSI) report for a first component carrier (CC) with transmission mode (TM) 10 and a second CSI report for a second CC with a legacy TM comprising at least one of TMs 1-9, the first and second CCs having a physical uplink control channel (PUCCH) reporting type, the transmission modes comprising transmission modes of a Long Term Evolution (LTE) cellular network;
schedule the first CSI report and the second CSI report for transmission in a subframe;
detect a collision between the first CSI report and the second CSI report;
transmit a radio resource control (RRC) message in response to detecting the collision between the first CSI report and the second CSI report to indicate the UE has received CCs comprising both TM 10 and the legacy TM; and
transmit the first or second CSI report based upon a prioritizing of the first CSI report and the second CSI report using the TM of the CSI reports when the PUCCH reporting type of the first and second CCs comprise a same first priority and a process index of the first CSI report and a process index of the second CSI report comprise a same second priority.

9. The user equipment of claim 8, wherein the second CSI report for the second CC with the legacy TM is to be prioritized over the first CSI report for the first CC with TM 10.

10. The user equipment of claim 8, wherein the first CSI report for the first CC with TM 10 is to be prioritized over the second CSI report for the second CC with the legacy TM.

11. The user equipment of claim 8, wherein the memory further includes instructions to:
identify the first CC with TM 10 and the second CC with the legacy TM with CSI process indices of the first and second CSI reports;

set the CSI process index of the second CC with the legacy TM to be equal to or greater than zero;
determine the CSI process indices associated with the first CC with TM 10 and the second CC with the legacy TM are different; and
prioritize the first CSI report or the second CSI report having a lowest CSI process index.

12. The user equipment of claim 8, wherein the memory further includes instructions to:
identify the first CC with TM 10 and the second CC with the legacy TM with CSI process indices and serving cell indices of the first and second CSI reports;
set the CSI process index of the second CC with the legacy TM to be equal to or greater than zero;
determine the CSI process indices associated with the first CC with TM 10 and the second CC with the legacy TM are the same; and
prioritize the first CSI report or the second CSI report having a lowest serving cell index.

13. The user equipment of claim 8, wherein the memory further includes instructions to:
identify the first CC with TM 10 and the second CC with the legacy TM with CSI process indices and serving cell indices of the first and second CSI reports;
set the CSI process index of the second CC with the legacy TM to be equal to zero; and
prioritize the second CSI report over the first CSI report.

14. The user equipment of claim 8, wherein the memory further includes instructions to:
assign a virtual CSI process index equal to zero for the second CC with the legacy TM to provide the second CSI report a highest priority; or
assign a virtual CSI process index equal to a non-zero value for the second CC with the legacy TM to provide the first CSI report a highest priority.

15. At least one non-transitory machine readable medium comprising instructions that, when executed by a user equipment (UE), cause the UE to perform operations for reporting uplink control information (UCI), the operations comprising:
generating a first channel state information (CSI) report for a first component carrier (CC) with transmission mode (TM) 10 and a second CSI report for a second CC with a legacy TM comprising at least one of TMs 1-9, the first and second CCs having a physical uplink control channel (PUCCH) reporting type, the transmission modes comprising transmission modes of a Long Term Evolution (LTE) cellular network;
scheduling the first CSI report and the second CSI report for transmission in a subframe;
detecting a collision between the first CSI report and the second CSI report;
transmitting a radio resource control (RRC) message in response to detecting the collision between the first CSI report and the second CSI report to indicate the UE has configured CCs comprising both TM 10 and the legacy TM; and
transmitting the first or second CSI report based upon a prioritizing of the first CSI report and the second CSI report using the TM of the CSI reports when the PUCCH reporting type of the first and second CCs comprise a same first priority and a process index of the first CSI report and a process index of the second CSI report comprise a same second priority.

16. The at least one non-transitory machine readable medium of claim 15, wherein the operations further comprise:
prioritizing the first CSI report or the second CSI report based on a default control value indicating prioritization of the second CSI report for the second CC with the legacy TM over the first CSI report for the first CC with TM 10.

17. The at least one non-transitory machine readable medium of claim 15, wherein the operations further comprise:
prioritizing the first CSI report or the second CSI report based on a default control value indicating prioritization of the first CSI report for the first CC with TM 10 over the second CSI report for the second CC with the legacy TM.

18. The at least one non-transitory machine readable medium of claim 15, wherein the operations further comprise:
identifying the first CC with TM 10 and the second CC with the legacy TM with CSI process indices of the first and second CSI reports;
setting the CSI process index of the second CC with the legacy TM to be equal to or greater than zero;
determining the CSI process indices associated with the first CC with TM 10 and the second CC with the legacy TM are different; and
prioritizing the first CSI report or the second CSI report having a lowest CSI process index.

19. The at least one non-transitory machine readable medium of claim 15, wherein the operations further comprise:
identifying the first CC with TM 10 and the second CC with the legacy TM with CSI process indices and serving cell indices of the first and second CSI reports;
setting the CSI process index of the second CC with the legacy TM to be equal to or greater than zero;
determining the CSI process indices associated with the first CC with TM 10 and the second CC with the legacy TM are the same; and
prioritizing the first CSI report or the second CSI report having a lowest serving cell index.

20. The at least one non-transitory machine readable medium of claim 15, wherein the operations further comprise:
identifying the first CC with TM 10 and the second CC with the legacy TM with CSI process indices and serving cell indices of the first and second CSI reports;
setting the CSI process index of the second CC with the legacy TM to be equal to zero; and
prioritizing the second CSI report over the first CSI report.

21. The at least one non-transitory machine readable medium of claim 15, wherein the operations further comprise:
assigning a virtual CSI process index equal to zero for the second CC with the legacy TM to provide the second CSI report a highest priority; or
assigning a virtual CSI process index equal to a non-zero value for the second CC with the legacy TM to provide the first CSI report a highest priority.

* * * * *